July 12, 1949.　　　H. W. MARTIN ET AL　　　2,475,749
ONE-REVOLUTION CLUTCH
Filed Oct. 15, 1946　　　3 Sheets-Sheet 1
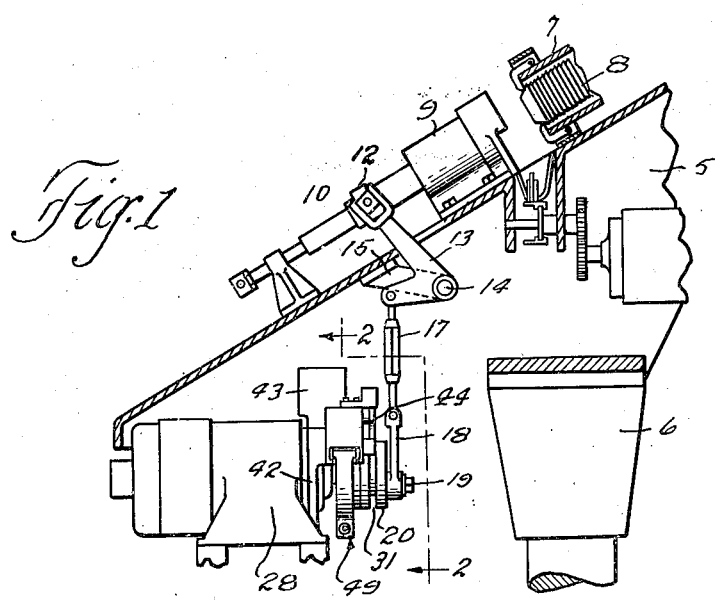
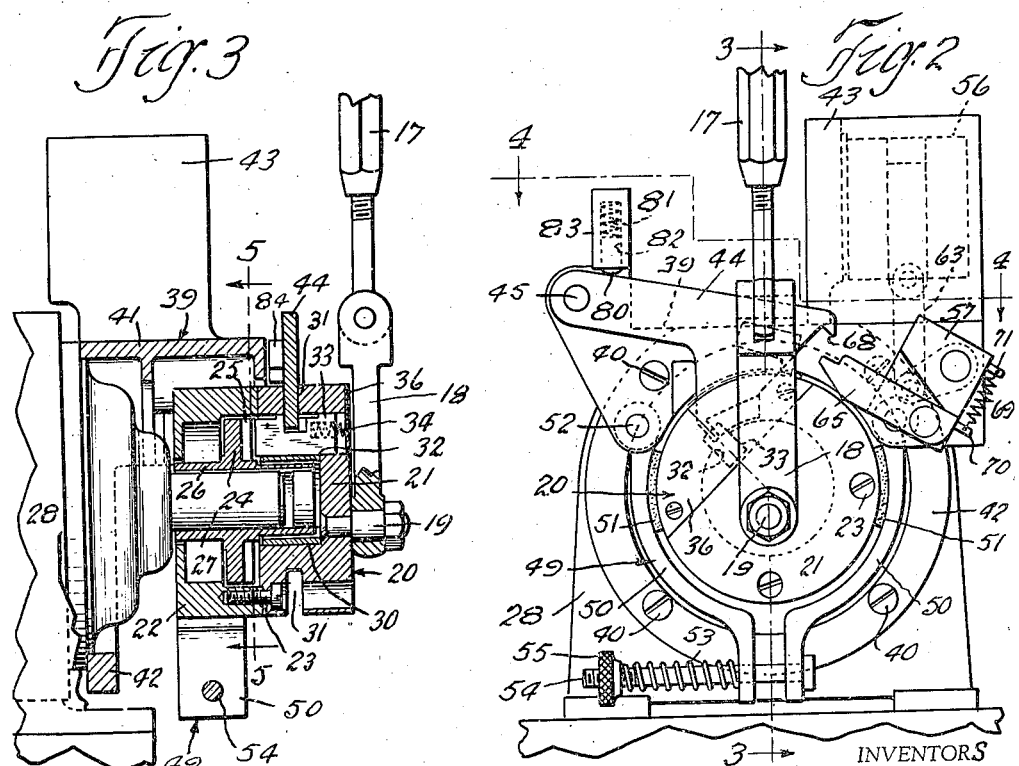
INVENTORS
Harold W. Martin
& Carl W. Goodwin
BY
ATTORNEY.

July 12, 1949.   H. W. MARTIN ET AL   2,475,749
ONE-REVOLUTION CLUTCH
Filed Oct. 15, 1946   3 Sheets-Sheet 2
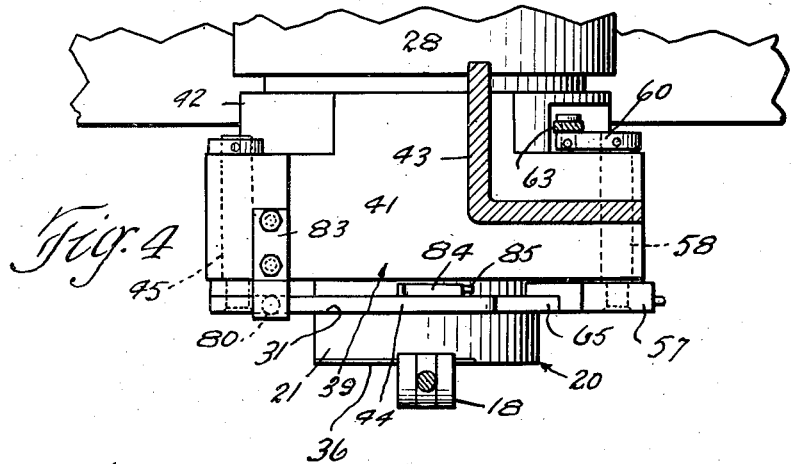
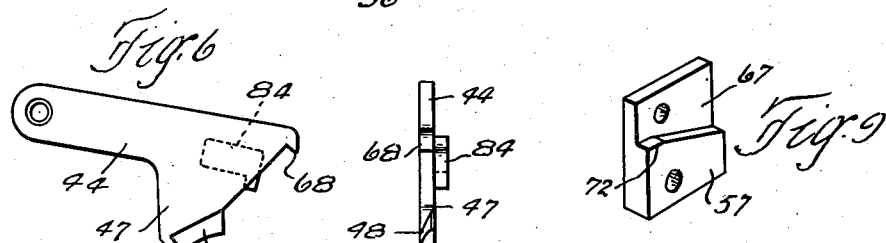
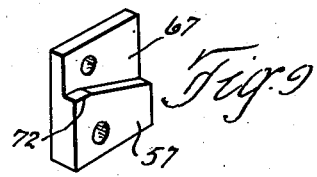
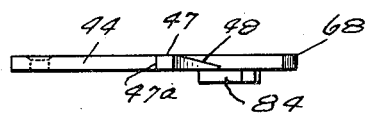
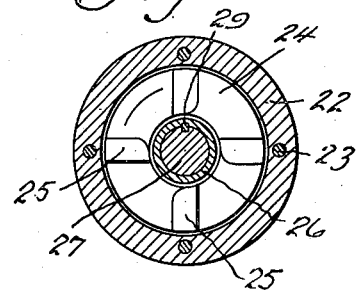
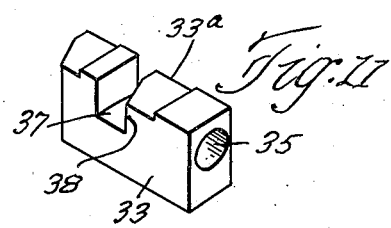
INVENTORS
Harold W. Martin
& Carl W. Goodwin
BY
ATTORNEY.

July 12, 1949.  H. W. MARTIN ET AL  2,475,749
ONE-REVOLUTION CLUTCH
Filed Oct. 15, 1946  3 Sheets-Sheet 3
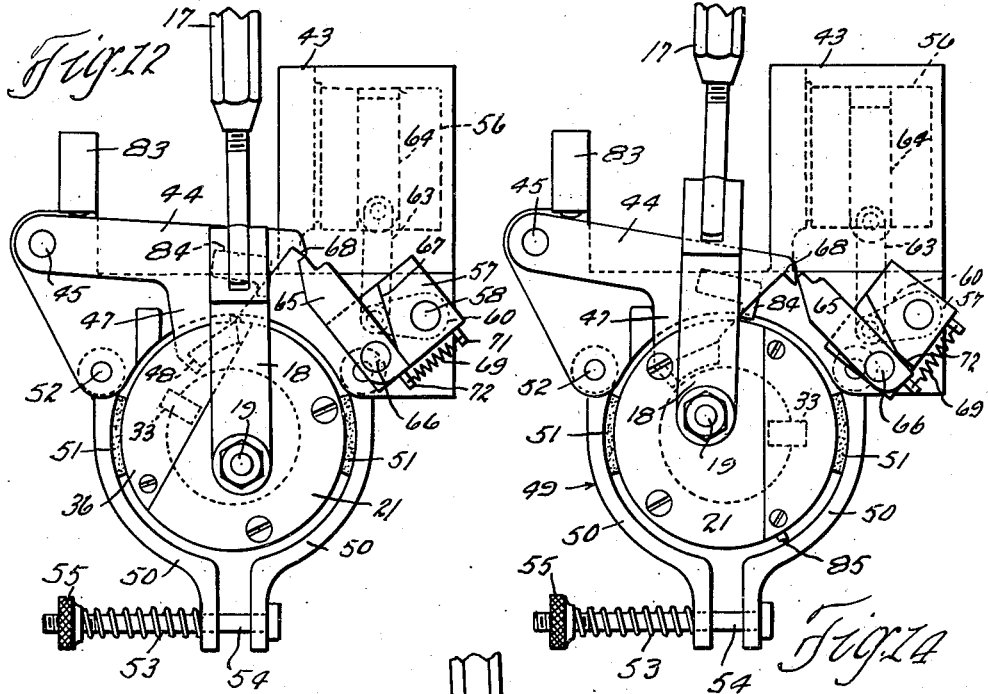
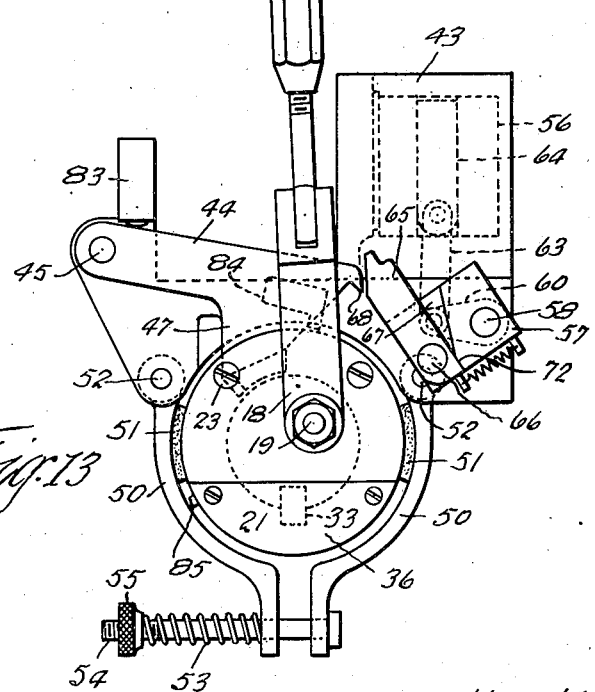
INVENTORS
Harold W. Martin
& Carl W. Goodwin
BY
ATTORNEY.

Patented July 12, 1949

2,475,749

UNITED STATES PATENT OFFICE 2,475,749

ONE-REVOLUTION CLUTCH

Harold W. Martin, Malverne, N. Y., and Carl W. Goodwin, Plainfield, N. J., assignors to American Seal-Kap Corporation of Delaware, Wilmington, Del., a corporation of Delaware Application October 15, 1946, Serial No. 703,420

2 Claims. (Cl. 192—24)

This invention relates broadly to that type of mechanism generally known as "one revolution clutch." Specifically, the present invention relates to a control mechanism through which the operation of clutches of this type is controlled. When energized, either electrically or mechanically, the control mechanism connects a normally stationary rotatably supported element of the clutch to a constantly rotating shaft. After this element has made one complete revolution, the control mechanism automatically disconnects it from the shaft and stops it at and holds it in its initial position until the control mechanism is again energized.

In the present invention the control mechanism includes a trip lever which in its normal at rest position holds the rotatably supported element of the clutch disconnected from the constantly rotating shaft. When the trip lever is actuated, or moved from its initial position, the rotatable clutch element and the shaft automatically engage and stay engaged until the trip lever returns to its initial position and disengages them. If the trip lever returns to its initial position before the rotatable element has made a complete revolution, it will release the rotatable element from the shaft and stop it in its initial position after one revolution, and it will be held in this position until the trip lever is again operated.

The trip lever is moved from its normal position, to effect a driving connection between the shaft and the rotatable clutch element, by a solenoid which is energized either by the machine to which it is connected or by an article fed into the machine, and the trip lever is returned to its initial position by gravity, assisted by spring means.

The principal object of the invention is to provide improved mechanical means for automatically releasing the trip lever from the solenoid after it has been moved a predetermined distance by the solenoid, and allowing it to return to its initial position which will prevent another actuation of the clutch element except as required in the proper operation of the machine in which the apparatus is incorporated.

Another object of the invention is to provide a device of this character which is simple and efficient in operation and is so constructed that it will operate continuously through a long period of time without appreciable wear on the parts thus eliminating costly shutdowns and repairs.

Other and more limited objects of the invention will be apparent from the following specification and the accompanying drawings forming a part thereof.

For the purpose of illustration, the invention is shown and described herein in connection with a machine for applying hood caps to milk bottles, such as is disclosed in the patent to Carl W. Goodwin et al. No. 2,325,163, and it is an improvement on the clutch control mechanism disclosed in our co-pending application Serial No. 664,388 filed April 23, 1946.

A machine of the above type includes a magazine containing stacks of nested preformed caps which are fed into a supply chamber from which they are successively picked by a special picker mechanism and are then advanced along a feed chute until they reach a cap applying station. At the last-mentioned station the caps are successively picked off by the necks of advancing milk bottles which carry them to a sealing station, where the skirts of the caps are folded around the necks of the respective milk bottles and sealed in place, all of which operations are fully described in the above-mentioned Goodwin et al. patent and form no part of the present invention.

The feed of caps in a machine of the above type is so synchronized with respect to the feed of the milk bottles that the caps are successively fed to the capping station to meet the advancing milk bottles as they pass such station. The picker mechanism, by which the caps are picked, one by one, from the supply chamber and deposited in the feed chute, includes a bottle-actuated switch actuating a picker solenoid. Each time the solenoid is energized the picker mechanism should operate once to pick a single cap from the supply chamber and deposit it in the feed chute. However, if the bottle-actuated switch should be held closed too long by a bottle, for example, due to stoppage of the bottle feed or due to the feed operating slowly, the picker mechanism may continue to operate to pick more than one cap from the supply chamber.

The present invention eliminates the foregoing difficulty and prevents more than one actuation of the picker mechanism for each energization of the picker solenoid regardless of the length of time the solenoid remains energized. This is accomplished by means of a novel mechanism which is interposed between the solenoid armature, and a one revolution clutch or other mechanism which is actuated thereby to operate the picker. This mechanism includes a trip lever which is positively operated whenever the solenoid is energized, and when so operated it actuates the picker. Immediately after such operation, however, the trip lever is automatically released and returned to its normal position of rest, thus preventing further operation of the picker until the solenoid has been deenergized and then subsequently energized again as by the next succeeding operation of the bottle-actuated switch.

The invention is also applicable to various other types of machines wherein an element is driven through one complete cycle and is then released and held until conditions again require its operation.

In the drawings:

Fig. 1 is a fragmentary section through a portion of a hood cap applying machine of the above mentioned type, showing in elevation a one revolution clutch mechanism embodying the present invention as applied to the cap picker;

Fig. 2 is a front elevation of the one revolution clutch and the control mechanism therefor, as viewed from the position indicated by the lines 2—2 of Fig. 1;

Fig. 3 is a central vertical section through the clutch and control mechanism, the plane of the section being indicated by the line 3—3 of Fig. 2;

Fig. 4 is a horizontal section taken on the line 4—4 of Fig. 2;

Fig. 5 is a transverse section through the clutch showing the clutch ratchet, the plane of the section being indicated by the line 5—5 of Fig. 3;

Fig. 6 is a side elevation of the trip lever;

Fig. 7 is a bottom plan view thereof;

Fig. 8 is a side elevation thereof, looking from the right of Fig. 6;

Fig. 9 is a perspective view of the trip latch;

Fig. 10 is a perspective view of the trip latch finger;

Fig. 11 is a perspective view of the clutch dog;

Fig. 12 is a view similar to Fig. 2 showing the clutch lever lifted to permit engagement of the clutch but not yet released by the trip latch finger;

Fig. 13 is a view similar to Figs. 2 and 12 showing the trip latch and finger just after they have lifted and released the trip lever and before they have returned to initial positions, but after the trip lever has fallen back into position to disengage the clutch after one revolution; and Fig. 14 is a view similar to Figs. 2, 12 and 13 showing the trip latch and finger returning to initial positions.

Referring to the drawings more in detail, Fig. 1 shows a portion of a cap picker of the type disclosed in the above-mentioned Goodwin et al. patent and includes a stationary frame 5 attached to a pedestal 6 which is adapted to rest upon the floor in a convenient position with respect to the bottle-filling machine.

The frame 5 supports a cap supply chamber 7 into which the preformed caps 8 are fed in a manner disclosed in the said Goodwin et al. patent. The picker mechanism for picking the caps from chamber 7 includes a cylindrical housing 9 mounted on the frame 5, and a sleeve 10 extending outwardly through housing 9 and carrying a collar 12 which is engaged by a forked arm 13 pivoted at 14 to a bracket 15 on the frame of the machine. The arm 13 is attached to one end of a link 17 by means of which the sleeve 10 and associated parts of the picker mechanism are reciprocated.

The picker mechanism is operated by a one revolution clutch which may be of any standard construction, one form of which is illustrated in Figs. 2, 3, 5 and 11. As shown therein, the other end of the link 17 is connected to a short link 18 which in turn is connected to a driving stud 19 eccentrically secured to a normally stationary rotatably supported clutch element 20.

The clutch element 20 consists of a front section 21 and a rear section 22 which are secured together by bolts 23. The rear section 22 of the clutch element 20 encloses a clutch ratchet 24 having a plurality of ratchet teeth 25. The ratchet 24 is formed integrally with a hub 26 which is keyed to the armature shaft 27 of a motor 28, by a key 29. The clutch element 20 is rotatably supported upon the forward end of the hub 26, which extends into a bore in the front section 21. A bushing 30 eliminates undue wear during operation. The front section 21 of the element 20 has an annular groove 31 and a transversely extending slot 32 formed therein. A clutch dog 33 is slidably mounted in the slot 32 and is normally urged into engagement with the ratchet 24 by a spring 34 which is disposed within a recess 35 in the clutch dog 33 and compressed between the clutch dog and a cover plate 36 which closes the outer end of the slot 32. The clutch dog 33 is slotted as indicated at 37. One wall of the slot 37 is beveled to provide a cam surface 38 which cooperates with a beveled cam surface on a trip lever as is hereinafter described. As long as the clutch dog 33 engages the ratchet 24 which is constantly rotating with the armature shaft 27 the clutch element 20 will be rotated in unison therewith. The clutch housing through the eccentrically mounted driving stud 19 in turn will operate any mechanism connected thereto as long as it is rotating. But as soon as the dog 33 is withdrawn from the ratchet 24 the housing 20 will stop rotating and will remain stationary until the dog 33 again engages the ratchet 24.

The clutch dog 33 is actuated as desired by the mechanism which forms the subject matter of this application. This mechanism is all carried by a bracket 39 which is secured to the motor 28 by bolts 40. The bracket 39 comprises a horizontally disposed base 41 having a downwardly ring like section 42 by which it is secured to the motor 28 by the bolts 40 and an upwardly extending offset shielded arm 43. A clutch trip lever 44 is secured at one end to a rock shaft 45 which is rotatably supported by suitable bearings in the bracket 39. The clutch lever 44 is disposed directly above the annular groove 31 in the clutch element 20 for movement in the plane of the orbital path of said clutch dog and has a downwardly extending extension 47 intermediate the ends thereof which rides in the groove 31. The lower end of the extension 47 is curved to conform to the base of the groove 31 and normally bears thereagainst. The forward end of extension 47 at the lower edge thereof is beveled to form a cam 48 which moves in an arc tangent to the path of the clutch dog 33 and is adapted to engage the cam surface 38 of the clutch dog 33 to withdraw the dog 33 out of engagement with the ratchet 24. To engage the clutch the clutch trip lever 44 is raised from the position shown in Fig. 2 to the position shown in Fig. 12 which withdraws it from engagement with the clutch dog 33. The spring 34 is then free to slide the dog 33 toward the constantly rotating ratchet 24 into engagement with one of the teeth 25. The clutch housing is then rotated. The clutch trip lever 44 can then be released and allowed to return to its normal position as shown in Fig. 2. The speed of operation is such that the clutch trip lever 44 can be raised, to start the clutch housing 20 rotating, and returned to its normal position in the groove 31 before the clutch housing 20 and clutch dog 33 make one complete revolution, as shown in Fig. 13. The cam 48 is then in position to engage the cam surface 38 of the dog 33 and withdraw it from the ratchet 24 thus stopping rotation of the clutch housing 20 after one revolution. A brake, generally indicated by the numeral 49, which constantly engages the rear section 22 of the clutch housing 20 keeps the clutch housing from overrunning and carrying the dog 33 past the extension 47 of the clutch trip lever 44, after the dog has been withdrawn from the ratchet 24 by the cam 48.

The clutch element 20 and the trip lever 44 are so constructed and arranged with respect to each other that the cam surface 38 of the dog 33 will engage the cam surface 48 of the trip lever 44 as the dog 33 is moving outwardly and downwardly from top dead center position which tends to pull the trip lever 44 down into the groove and prevents any chattering of the trip lever. It has been found that if the clutch element 20 and the trip lever 44 are so arranged with respect to each other that their cam surfaces engage during the upward and inward movement of the dog 33 towards top dead center, the trip lever will be raised in the slot 31 which creates an objectionable chattering of the lever 44.

This arrangement of the clutch element 20 and the trip lever 44 also serves another purpose. It has also been found that under certain conditions of operation the trip lever is raised, released and returns to its initial position before the dog 33 has been moved entirely out of the way by the ratchet 24, in which case the lower surface of the extension 47 of the trip lever 44 strikes the dog 33. In this case if the dog 33 is arranged to come to rest in top dead center position, for instance, as is shown in our aforesaid co-pending application, the bottom surface of the extension 47 will strike the top surface of the dog 33 with the cam surfaces 38 and 48 slightly overlapping, and tend to drive the dog radially inwardly. This action soon destroys the cam surfaces 38 and 48 and necessitates the replacing of the dog 33 and the trip lever. But with the parts arranged as shown herein, the rear surface 47a of the extension 47 will strike the rear wall 33a of the dog 33, in the event that the lever 44 returns to initial position before the dog 33 is completely out of the way. The impact of the lever 44 against the side of the dog 33 will then rotate the clutch element in its normal direction of rotation which will carry the dog out of the way of the lever 44 without damage to either of the cam surfaces 38 or 48.

The brake 49 comprises two brake shoes 50 having suitable brake linings 51 secured thereto. The shoes are pivotally mounted upon studs 52, carried by the brackets 39, and are urged toward each other into engagement with the clutch housing 20 by a spring 53 on a bolt 54 which extends through the lower ends of the shoes 50. The pressure of the spring 53 may be adjusted by a nut 55 on the bolt 54.

The clutch trip lever 44 is raised through suitable mechanism to effect operation of the cap dispensing mechanism, by a solenoid 56 which is energized by a bottle-actuated switch on a capping machine (not shown). This mechanism is so constructed and arranged that the clutch element 20 can only be rotated one revolution for each energization of the solenoid. The solenoid must be deenergized and the mechanism returned to original position before the clutch trip lever 44 can again be raised to effect operation of the clutch. The action of this mechanism is illustrated in Figs. 2, 12, 13 and 14.

A clutch trip latch 57 is rigidly secured to one end of a shaft 58 rotatably mounted in suitable bearings in the bracket 39. A lever 60 is rigidly secured at one end to the opposite end of the shaft 58. The other end of the lever 60 is pivotally connected to the lower end of a link 63 which is pivotally connected at its upper end to the core 64 of the solenoid 56. A trip finger 65 is pivotally secured at 66 to the trip latch 57, within a recess 67 therein. The trip finger 65 is disposed in alignment with the clutch trip lever 44 and normally extends under a hook 68 on the free end of the trip lever, as shown in Fig. 2. A spring 69 secured at one end to a pin 70 carried by the finger 65 and at the other end thereof to a pin 71 carried by the trip latch 57 normally urges the trip finger outwardly from the recess 67. This outward movement is limited by the finger 65 abutting a stop 72.

When the solenoid 56 is energized the clutch trip latch 57, and the trip finger carried thereby, are rotated from the position shown in Fig. 2 to the position shown in Fig. 13; and then when the solenoid is deenergized the latch 57 returns to the position shown in Fig. 2. During the initial part of this movement the trip finger 65 will engage the hook 68 and raise the free end of the trip lever 44 to the position shown in Fig. 12 which releases the clutch dog 33 and allows the spring 34 to move it into engagement with ratchet 24, engaging the clutch. After a very slight further movement of the trip latch 57 beyond the position shown in Fig. 12 towards the position shown in Fig. 13, the trip finger 65 will release the trip lever 44 allowing it to return to the position shown in Fig. 12 before the clutch housing has made a complete revolution so that it is in position to engage and withdraw the dog 33 and disengage the clutch at the end of one complete revolution thereof. After the solenoid 56 has been deenergized the trip latch will return to the position shown in Fig. 2 and in so doing it will pass through the position shown in Fig. 14, when the trip finger 65 is forced back into the recess 67 by the hooked end 68 of the trip lever 44 against the tension of the spring 69. After the end of the trip lever 65 has passed the hook 68 the spring 69 will move it back beneath the hook 68 against the stop 72, as shown in Fig. 2, where it is ready to effect engagement of the clutch when the solenoid 56 is again energized.

The shape and weight of the trip latch 57 and its connection to the shaft 58 are such that it will quickly drop back by gravity to its normal position after each actuation without the use of springs.

From the foregoing, it will be seen that the clutch element 20 will make only one revolution each time the solenoid 56 is energized, and that this will be true regardless of the length of time the solenoid 56 remains energized. Thus, when this novel mechanical release is employed as illustrated with the picker mechanism of a capping machine, the trip lever 44 controlling the clutch mechanism will be raised to effect engagement of the clutch each time the solenoid 56 is energized and then automatically released so that it can return to its normal position of rest in time to prevent further operation of the picker mechanism until the solenoid has been deenergized and then subsequently energized as by the next succeeding operation of the bottle-actuated switch. The lever 44 will normally return to its initial position by gravity, but to insure its quick return, we have provided a plunger 80 which is urged downwardly against the upper edge of the lever 44 by a spring 81. The plunger 80 and spring 81 are disposed in a recess 82 in a block 83 which is secured to the bracket 39 and extends outwardly therefrom over the lever 44.

In normal operation the clutch housing 20 will stop in the position shown in Fig. 2 after making one revolution. In this position the dog 33 is engaged by the extension 47 of the lever 44 and is held out of engagement with the teeth 25 of the ratchet 24 so that the clutch housing 20 can not be rotated again until the clutch dog has been released by the lever 44. It has been found by experience that sometimes, due to the inertia of the parts, the dog 33 will be carried on beyond the extension 47 of the trip lever 44 where it can again engage one of the ratchet teeth 25 thus causing an uncalled for operation of the mechanism. This generally occurs when the brake lining 51 has become worn due to operation and the nut 55 has not been adjusted to increase the pressure of the spring 53 so as to compensate for the wear of the lining 51.

In order to obviate this occasional objectionable operation, we have provided a positive stop which will always stop the mechanism in the position shown in Fig. 2 after the dog 33 has been withdrawn from the ratchet 24. This stop comprises an abutment 84, secured to the rear face of the trip lever 44, which engages a lug 85 secured to the periphery of the section 21 of the clutch housing 20. The abutment 84 and lug 85 are so positioned with respect to each other and the rest of the mechanism that they will engage just as the parts reach the position shown in Fig. 2. This positive stop only comes into operation when there is a tendency of the parts to override due to the improper adjustment of the brake 49.

From the foregoing it will be apparent to those skilled in this art that we have provided a very simple and efficient mechanism for accomplishing the objects of our invention.

Although a specific embodiment of the invention has been shown for purposes of illustration, it is to be understood that various changes and modifications may be made therein as will be readily apparent to a person skilled in the art. Furthermore, the mechanical releasing mechanism of the invention may, of course, be used for various other purposes and in various other types of machines, without departing from the scope and spirit of the invention as defined in the appended claims.

What is claimed is:

1. In a device of the character described, the combination of a drive shaft, a normally stationary rotatably supported clutch element, a clutch dog slidably mounted in said clutch element and rotatable therewith and adapted to establish a driving connection between said drive shaft and said clutch element, spring means normally urging said dog into driving position, a trip lever having a cam normally disposed in the orbital path of said dog entirely to one side of and beyond the top of said orbital path in the direction of rotation of said dog, said trip lever being pivoted for movement in the plane of said orbital path so that the paths of said cam and of said dog are tangent, said cam normally engaging and holding said clutch dog out of engagement with said ratchet, a trip latch pivotally mounted adjacent the free end of said trip lever, a finger pivoted to said latch below said lever and extending upwardly to first engage and lift said lever when said latch is rotated, and then to pass the end of said lever to release the same, means to positively rotate said latch in the direction to cause the finger to engage and lift said lever and thereby withdraw said cam from the orbital path of said clutch dog, and then to release said lever and allow said lever to drop back in position to engage and withdraw said clutch dog after one revolution of said clutch element, a spring holding said finger in lever-lifting position and allowing said finger to be retracted to pass the end of said lever during the return movement of said latch.

2. In a device of the character described, the combination of a drive shaft, a normally stationary rotatably supported clutch element, a clutch dog slidably mounted in said clutch element and rotatable therewith and adapted to establish a driving connection between said drive shaft and said clutch element, spring means normally urging said dog into driving position, a trip lever having a cam normally disposed in the orbital path of said dog entirely to one side of and beyond the top of said orbital path in the direction of rotation of said dog, said trip lever being pivoted for movement in the plane of said orbital path so that the path of said cam and of said dog are tangent, said cam normally engaging and holding said clutch dog out of engagement with said ratchet, a trip latch pivotally mounted adjacent the free end of said trip lever, a finger pivoted to said latch below said lever and extending upwardly to first engage and lift said lever when said latch is rotated, and then to pass the end of said lever to release the same, means to positively rotate said latch in the direction to cause the finger to engage and lift said lever and thereby withdraw said cam from the orbital path of said clutch dog, and then to release said lever and allow said lever to drop back in position to engage and withdraw said clutch dog after one revolution of said clutch element, a spring holding said finger in lever-lifting position and allowing said finger to be retracted to pass the end of said lever during the return movement of said latch, and means to positively stop the rotation of said clutch element after said dog has been withdrawn, said last mentioned means including a lug secured to said clutch element and an abutment secured to said trip lever and positioned to be raised out of the path of said lug when said lever is raised by said finger.

HAROLD W. MARTIN.
CARL W. GOODWIN.

REFERENCES CITED

The following references are of record in the file of this patent:

UNITED STATES PATENTS

| Number | Name | Date |
|---|---|---|
| 346,093 | Cummings | July 27, 1886 |
| 365,652 | Thom | June 28, 1887 |
| 489,849 | Crain | Jan. 10, 1893 |
| 501,902 | Spindler | July 18, 1893 |
| 628,390 | Clarke | July 4, 1899 |
| 826,395 | Whitlock | July 17, 1906 |
| 945,565 | Marshall | Jan. 4, 1910 |
| 977,581 | Baltzley | Dec. 6, 1910 |
| 1,215,972 | Nuberg et al. | Feb. 13, 1917 |
| 1,425,994 | McCullough | Aug. 15, 1922 |
| 1,471,350 | Piaser | Oct. 23, 1923 |
| 2,050,546 | Schuessler | Aug. 11, 1936 |
| 2,325,102 | Boschen | July 27, 1943 |